(No Model.)
E. BENNETT.
EARTHENWARE TEA POT.
No. 273,221. Patented Feb. 27, 1883.
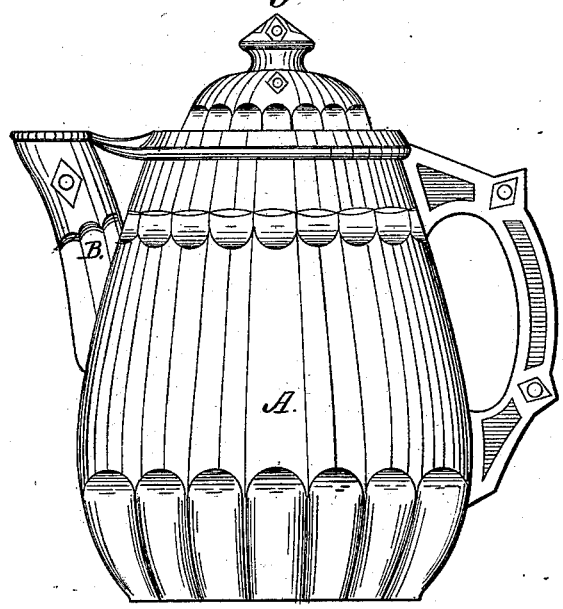
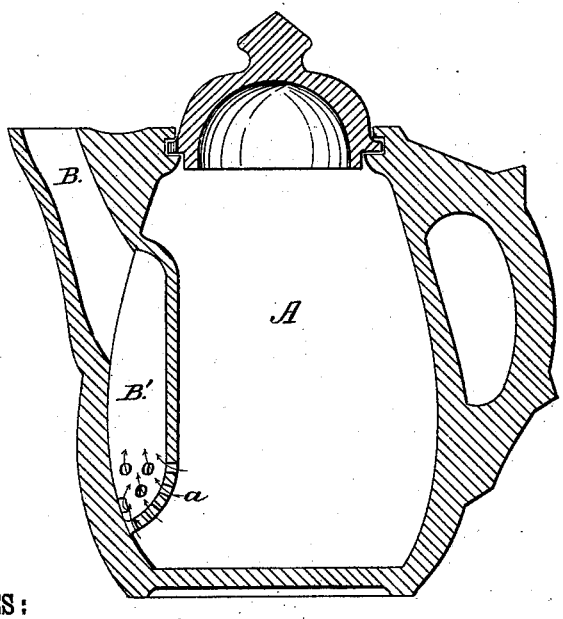
WITNESSES:
W. W. Hollingsworth
Edw. U. Byrn
INVENTOR:
Edwin Bennett
BY
ATTORNEYS.

UNITED STATES PATENT OFFICE.

EDWIN BENNETT, OF BALTIMORE, MARYLAND.

EARTHENWARE TEA-POT.

SPECIFICATION forming part of Letters Patent No. 273,221, dated February 27, 1883.

Application filed August 5, 1882. (No model.)

*To all whom it may concern:*

Be it known that I, EDWIN BENNETT, of Baltimore city, State of Maryland, have invented a new and useful Improvement in Earthenware Tea-Pots; and I do hereby declare that the following is a full, clear, and exact description of the same, reference being had to the accompanying drawings, forming part of this specification, in which—

Figure 1 is a side view of the tea-pot; and Fig. 2, a vertical section of the same, taken through the spout.

My invention relates to an improvement in earthenware tea-pots designed to render the same less liable to have their spouts broken off.

My invention consists in an earthenware tea-pot having its spout connected throughout its length with the body of the pot in a homogeneous manner, and formed with the upper half outside the pot, while the lower half is inside the pot, and provided with perforations for straining the tea from its leaves.

In the drawings, A represents an earthenware tea-pot, whose spout B B' is made of the same material, and is connected throughout its entire length with the side wall of the body of the pot in a homogeneous manner, so that there is no open space whatever intervening between the spout and the body of the pot, but the spout is, on the other hand, braced and strengthened by a direct connection throughout its length with the body of the pot.

In constructing the spout, the mode of arranging it is, as shown, to form the upper half of the spout B on the outside of the pot at the smaller upper diameter of the pot, and with its lower half, B', on the inside of the pot where the pot is largest, a hole being left about the middle of pot in its wall, connecting the said upper and lower sections of spout. The bottom portion of the spout is perforated with numerous holes $a$, to strain the tea from the leaves, and as the lower portion of the spout projects inwardly from the inside wall of the tea-pot a considerable distance, some of these holes are placed at the line of juncture between the projecting spout portion B' and the wall of the pot, so that the tea can drain perfectly from the pot through the spout.

In making use of my invention I may apply the same principles of construction to earthenware coffee-pots, cream and molasses pitchers, and other analogous articles.

With respect to the ornamental design, (shown incidentally in Fig. 1,) I would state that I reserve the right to claim this in a separate application for a Design Patent which I propose to make hereafter.

Having thus described my invention, what I claim as new is—

An earthenware tea-pot having its spout made with the upper portion, B, on the outside and the lower portion, B', on the inside, both homogeneously connected throughout their length with the side wall of the pot, and communicating with each other at their adjacent ends through a hole located about the middle of the side wall of the pot, as described.

EDWIN BENNETT.

Witnesses:
WILLIAM C. ORR,
WILBUR T. FRANCE.